Sept. 25, 1956   M. G. ANDERSON   2,764,220
METHOD OF MAKING A TIRE
Filed Sept. 13, 1954
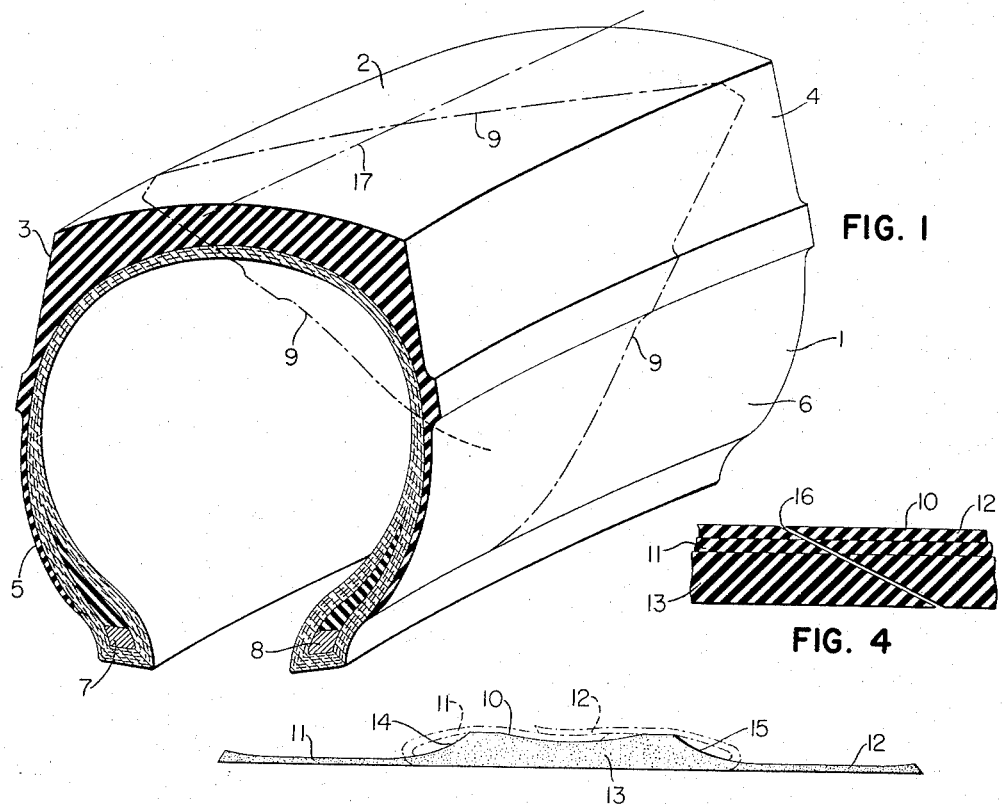
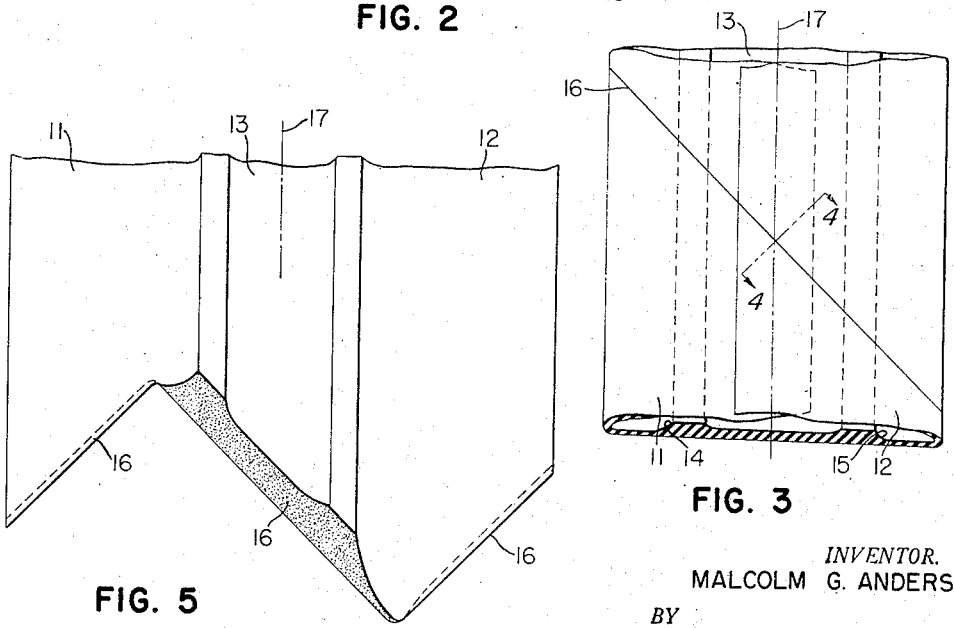
INVENTOR.
MALCOLM G. ANDERSON
BY
R. L. Miller
ATTORNEY

United States Patent Office 2,764,220
Patented Sept. 25, 1956

2,764,220

METHOD OF MAKING A TIRE

Malcolm G. Anderson, Hudson, Ohio, assignor to The Goodyear Tire & Rubber Company, Akron, Ohio, a corporation of Ohio Application September 13, 1954, Serial No. 455,602

9 Claims. (Cl. 154—14)

This invention relates to pneumatic tires and a new method for making the same and more particularly to an improved method of preparing the extruded unvulcanized tread for application to the tire carcass.

It is essential that the unvulcanized tire tread be cut to substantially the exact length required to go around the carcass and, at the same time, have the ends of the tread mate when joined together. It has been the practice for many years in tire manufacturing practices to skive the extruded tread section as it moves along a conveyor after it leaves the tube machine. The skive is made at an angle to the surface of the tread with the path of the cut across the width of the extruded tread at approximately 90° to the length of the tread. A single cut skives one end of two adjacent treads at one time, and since each cut along the length of extruded length is identical, the cuts on the opposite ends of each tread length mate when the tread is wrapped around the tire carcass.

When the tread is spliced on the tire carcass it is very difficult, if not impossible, to maintain the exact cross section of the tread in the area of the splice. Usually the thickness in the vicinity of the tread splice varies considerably and may be thicker or thinner or both and, in many instances, during vulcanization, there is insufficient flow to remove the variations in thickness. As a result, the inner surface of the finished tire in the area of the splice is distorted because the resilience of the airbag or diaphragm used during vulcanization absorbs the distortion rather than the rigid mold surface. As a result, to all outward appearances, there is no distortion in the tire but the distortion of the carcass is sufficient in many instances to produce a "thumper."

Many ideas to correct or eliminate the "thumpers" have been tried but little progress has been made. It has been found that by forming the splice so that in the shoulder area the splice points are not opposite each other, the thump is eliminated or satisfactorily reduced in most instances. One means of providing a substantial peripheral distance between the splices in the shoulder area of the tire tread is to cut the ends of the tread at a substantial angle to the length or longitudinal center line of the tread. When the tread is applied to the tire carcass, the splice runs diagonally across the road-contacting portion of the tread so that the splice in one shoulder portion is not opposite the one in the other shoulder portion. It is therefore an object of this invention to provide means for preparing an unvulcanized tire tread for application to the tire carcass.

Another object of the invention is to provide an economical and simple method of preparing the tread.

A further object of the invention is to provide a tire that has no "thump."

A still further object of the invention is to provide a method of preparing a tire tread that does not involve a substantial amount of additional capital investment to provide the necessary equipment to carry out the invention.

These and other objects will appear hereinafter as the description of certain preferred embodiments of the invention proceeds, the features, arrangements and combination being clearly pointed out in the specification and in the claims appended.

In the drawings:

Figure 1 is a perspective view of a partial tire section;

Figure 2 is a diagrammatic end view of an extruded tire tread;

Figure 3 is a diagrammatic plan view of a portion of the length of extruded tire tread;

Figure 4 is an enlarged section taken along 4—4 of Figure 3; and

Figure 5 is a developed plan view of a tire tread after cutting according to the teachings of the invention.

In the development of the modern automobiles, the wheel suspension systems have been improved to provide for easier handling and greater stability with the resulting improved ride. These improvements have resulted in more sensitive suspension systems so that any irregularities or roughness in the unsprung weight, principally the wheels and tires, becomes very noticeable to the operator. In many instances, a pronounced thump is apparent during the operation of the vehicle over a relatively smooth road and is very annoying to the operator. Generally the thump is caused by the tire and, although a thumper tire is not necessarily a defective tire from the point of serviceability, it is objectionable to the operator.

The unevenness in the tire carcass caused by improper distribution of the tread material in the area of the tread splice, particularly in the shoulder portion, has been one of the major factors in causing the thump and the tire manufacturers have attempted to devise means to eliminate this. Various means have been tried with varying degrees of success but the most effective means yet devised has been to form the splice at a substantial angle across the width of the tread, now referred to as the "Z" construction. In the present practices, the splice is made straight across the green tire carcass and, resultingly, remains in substantially the same position in the finished tire.

In Figure 1 the numeral 1 represents a typical vulcanized tire carcass having a road-contacting tread portion 2 with shoulder portions 3 and 4 along the opposite edges. Sidewall portions 5 and 6 extend inwardly from the shoulders 3 and 4 and terminate in inextensible beads 7 and 8. The line 9 represents diagrammatically the approximate path of the tread splice in the finished tire after the tire is shaped and vulcanized. The tread splices at the shoulders 3 and 4 are not opposite but substantially distributed peripherally along the tire 1 so that the tread splice portion of the tire at shoulder 3 does not contact the road at the same time as the splice portion at shoulder 4.

The unvulcanized tire tread 10 having a cross section contour such as represented in Fig. 2 is extruded from a tube machine in a continuous operation in the usual manner and is carried by a conveyor. Usually while on the conveyor the tread is cut to the desired length automatically by a skiving apparatus but may be cut at any desired time. These operations are well known in tire manufacturing operations. Before cutting the sidewall portions 11 and 12 are folded over the center section 13 of the tread 10 as illustrated by the dotted lines in Fig. 2. The fold takes place along the edge of the shoulder portions 14 and 15 of the unvulcanized tread 10 and the folded-over portions are held in place by any desired hold-down clamps as they approach the skiving apparatus (not shown). A skiver of the usual construction is arranged to skive or cut the tread at a substantial angle to the longitudinal center line of the tread as shown by line 17 in Fig. 3. A 45° angle between the longitudinal center line 17 of the tread 10 and the skive cut 16 has been found to be satisfactory although the angle may vary from 30° to 60° with acceptable results.

As seen in Figure 4, the skive or cut preferably is also at a substantial angle with the surface of the tread to provide a greater area of contact for the splice of the tire tread when applying to the tire carcass. An included angle of 20° has been found to be satisfactory although any desired angle may be used. The angle of the cut with respect to the tread surface is known as the skive angle.

As the continuous length of unvulcanized tire tread passes along the conveyor after it is extruded from the tube machine, the skive cuts 16 are usually made automatically and at spaced intervals to produce the desired length of tread for application to the tire carcass. It is readily apparent that one skive of the tread simultaneously produces a skived end on two adjacent tread sections. Resultingly the opposite ends of the tread 10 have allochiral zig zag or substantially Z-shaped skive ends and therefore mate when applied to the tire carcass.

Due to the irregular upper surface of the extruded tread the cuts are somewhat irregular in appearance but are identical to each other when the folded-over sidewall portions are unfolded. If the cut is projected to a single plane then the finished cut appears substantially as illustrated in Fig. 5 with the skive angle of the sidewall portions being opposite to that of the center portion of the tread. The pattern of the skive is generally Z-shaped with the cut in the sidewall portions extending in opposite directions to each other from the end of the center section cut.

In applying the tread to the tire carcass in the usual manner it is necessary to lift slightly the ends of the sidewall first applied so that the last applied ends of the sidewall can be adhered to the carcass first. This is necessary since the bevel or skive of the sidewall portions is opposite to that of the center section of the tread so that the splice may be made properly.

In skiving the tread with the sidewall portions folded back onto the center portion, the sidewall portions are more firmly supported and as a result the skiving apparatus produces a sharper and truer skive. It is very difficult to cut relatively thin unsupported sections of unvulcanized rubber without distorting or tearing the rubber. In addition the overall length of the unvulcanized skived tread is substantially less than that of a tread in which the cut has been made at 45° across the entire width of the tread. The additional increase in the length of the tread when cut with the folded sidewall portion is not of such a magnitude as to require in most instances increased length in the tread-handling equipment such as books, tread applicators etc., with the result that it is only necessary to alter the skiving apparatus.

When the unvulcanized tire tread is applied to the tire carcass and then the tire is shaped and vulcanized according to the well-known practices, the finished splice in the tread of the tire appears as illustrated in Fig. 1. Due to the shaping of the tire prior to vulcanizing, the angle between the longitudinal center line of the tread and the splice decreases substantially. If the original angle is 45°, the finished angle is approximately 30°. The splice of the road-containing section of the tread extends down into the shoulder portions 3 and 4 of the tire. The splices in the sidewall portions are inclined at a substantial angle both to the radius of the tire and the splice in the road-containing portion. The splices in the sidewall portions 5 and 6 are similar but extend in opposite directions with respect to each other.

While certain representative embodiments and details have been described and shown for the purpose of illustrating the invention, it will be apparent to those skilled in this art that various changes and modifications may be made therein without departing from the spirit or scope of the invention.

Having thus fully described my invention, what I claim and desire to secure by Letters Patent of the United States is:

1. The method of preparing an unvulcanized extruded tread for splicing on application to a tire carcass by forming mating zig-zag cuts on the opposite ends thereof, including the steps of folding back a substantial portion of the side sections of the tread on the center section of the tread, cutting through the tread and folded-back sections at other than a 90° angle both to the surface and to the longitudinal center line of the tread and repeating the steps at a second position along the length of the tread to angularly skive the ends thereof so that when said ends are joined in applying to the tire carcass, an angular splice results in the center section of the tread.

2. The method of preparing an unvulcanized extruded tread for splicing on application to a tire carcass by forming mating zig-zag cuts on the opposite ends thereof, including the steps of folding back a substantial portion of the side sections of the tread on the center section of the tread, cutting through the tread and folded-back sections at an angle between 30° and 60° to the longitudinal center line of the tread and an angle of 20° to 50° to the surface of the tread and repeating the steps at a second position along the length of the tread to angularly skive the ends thereof so that when said ends are joined in applying to the tire carcass an angular splice results in the center section of the tread.

3. The method of preparing an unvulcanized extruded tread for splicing on application to a tire carcass by forming mating zig-zag cuts on the opposite ends thereof, including the steps of folding back a substantial portion of the side sections of the tread on the center section of the tread, cutting through the tread and folded-back sections at substantially 45° to the longitudinal center line of the tread and an angle of 20° to 50° to the surface of the tread and repeating the steps at a second position along the length of the tread to angularly skive the ends thereof so that when said ends are joined in applying to the tire carcass an angular splice results in the center section of the tread.

4. The method of cutting to a predetermined length a one-piece unvulcanized extruded member having a center tread section with side wall sections on each side thereof and adapted to be applied to an unvulcanized tire carcass including the steps of folding back a substantial portion of each side wall section on the center tread section at least in the area where the cut is to be made, cutting through the thickness of the tread and folded-over portions across the width of the folded tread at an angle, other than 90°, to the surface thereof and at a substantial angle, other than 90°, to the longitudinal centerline, and repeating the steps at a second position along the length of the member at the predetermined length to produce allochiral zig-zag cuts at the opposite ends of the tread member adapted to be spliced together when applied to the tire carcass.

5. The method of cutting to a predetermined length a one-piece unvulcanized extruded member having a center tread section with side wall sections on each side thereof and adapted to be applied to an unvulcanized tire carcass including the steps of folding back a substantial portion of each side wall section on the center tread section at least in the area where the cut is to be made, cutting through the thickness of the tread and folded-over portions across the width of the folded tread at an angle, other than 90°, to the surface thereof and at a substantial angle, other than 90°, to the longitudinal centerline, repeating the steps at a second position along the length of the member at the predetermined length and unfolding the folded-over portions of the tread to produce allochiral zig-zag cuts at the opposite ends of the tread member adapted to be spliced together when applied to the tire carcass.

6. The method of cutting to a predetermined length a one-piece unvulcanized extruded member having a center tread section with side wall sections on each side thereof and adapted to be applied to an unvulcanized tire carcass including the steps of folding back a substantial portion of each side wall section on the center tread section at least in the area where the cut is to be made, cutting through the thickness of the tread and folded-over portions across the width of the folded tread at an angle, other than 90°, to the surface thereof and at a substantially 45° angle to the longitudinal centerline, repeating the steps at a second position along the length of the member at the predetermined length and unfolding the folded-over portions of the tread to produce allochiral zig-zag cuts at the opposite ends of the tread member adapted to be spliced together when applied to the tire carcass.

7. The method of cutting to a predetermined length a one-piece unvulcanized extruded member having a center tread section with side wall sections on each side thereof and adapted to be applied to an unvulcanized tire carcass including the steps of folding back a substantial portion of each side wall section on the center tread section at least in the area where the cut is to be made, cutting through the thickness of the tread and folded-over portions across the width of the folded tread at an angle, other than 90°, to the surface thereof and at a substantial angle, other than 90°, to the longitudinal centerline, and repeating the steps at a second position along the length of the member at the predetermined length whereby allochiral Z-shaped cuts are formed on opposite ends of the member for splicing when applying to the tire carcass.

8. The method of cutting to a predetermined length a one-piece unvulcanized extruded member having a center tread section with side wall sections on each side thereof and adapted to be applied to an unvulcanized tire carcass including the steps of folding back a substantial portion of each side wall section on the center tread section at least in the area where the cut is to be made, cutting through the thickness of the tread and folded-over portions across the width of the folded tread at an angle, other than 90°, to the surface thereof and at an angle between 30° and 60° to the longitudinal centerline, and repeating the steps at a second position along the length of the member at the predetermined length whereby allochiral Z-shaped cuts are formed on opposite ends of the member for splicing when applying to the tire carcass.

9. The method of cutting to a predetermined length a one-piece unvulcanized extruded member having a center tread section with side wall sections on each side thereof and adapted to be applied to an unvulcanized tire carcass including the steps of folding back a substantial portion of each side wall section on the center tread section at least in the area where the cut is to be made, cutting through the thickness of the tread and folded-over portions across the width of the folded tread at an angle, other than 90°, to the surface thereof and at a substantially 45° angle to the longitudinal centerline, and repeating the steps at a second position along the length of the member at the predetermined length whereby allochiral Z-shaped cuts are formed on opposite ends of the member for splicing when applying to the tire carcass.

References Cited in the file of this patent

UNITED STATES PATENTS

| | | |
|---|---|---|
| 2,473,067 | Miller | June 14, 1949 |
| 2,672,914 | Weigold et al. | Mar. 23, 1954 |
| 2,678,678 | Kuechenmeister et al. | May 18, 1954 |
| 2,686,554 | Hinman | Aug. 17, 1954 |

FOREIGN PATENTS

| | | |
|---|---|---|
| 25,172 | Great Britain | 1912 |